(12) United States Patent  
Hannington (10) Patent No.: US 9,671,533 B2
(45) Date of Patent: Jun. 6, 2017

(54) HIGH REFLECTIVITY OPEN BEAD METHOD AND MATERIAL

(71) Applicant: Avery Dennison Corporation, Glendale, CA (US)

(72) Inventor: Michael Hannington, Madison, OH (US)

(73) Assignee: Avery Dennison Corporation, Glendale, CA (US)

( * ) Notice: Subject to any disclaimer, the term of this patent is extended or adjusted under 35 U.S.C. 154(b) by 0 days.

(21) Appl. No.: 14/572,934

(22) Filed: Dec. 17, 2014

(65) Prior Publication Data

US 2015/0185375 A1 Jul. 2, 2015

Related U.S. Application Data

(60) Provisional application No. 61/921,617, filed on Dec. 30, 2013.

(51) Int. Cl.
*G02B 5/128* (2006.01)
*B32B 37/24* (2006.01)
*B29C 70/64* (2006.01)
*B29C 67/00* (2017.01)

(52) U.S. Cl.
CPC .......... *G02B 5/128* (2013.01); *B29C 67/0059* (2013.01); *B29C 70/64* (2013.01); *B32B 37/24* (2013.01); *B32B 2037/243* (2013.01); *B32B 2037/246* (2013.01); *B32B 2307/416* (2013.01); *Y10T 156/10* (2015.01)

(58) Field of Classification Search
CPC .......... G02B 5/128; G02B 5/206; G02B 5/20; G02B 5/124; B32B 37/24; B32B 2037/243; B32B 2037/246; B29C 70/74; B29C 70/64; B29D 11/00615

USPC ................. 359/529, 530, 536, 540
See application file for complete search history.

(56) References Cited

U.S. PATENT DOCUMENTS

| 2,354,018 A | 7/1944 | Clarke et al. |
| 2,354,048 A | 7/1944 | Paimquist |
| 2,354,049 A | 7/1944 | Palmquist |

(Continued)

FOREIGN PATENT DOCUMENTS

WO 2013/127874 9/2013

OTHER PUBLICATIONS

Ferguson, "Advances in aluminum pigment technology to meet the demans of the coatings industry," Oct. 31, 2005, pp. 34-36, http://www.silberline.com/uploadedFiles/About_Silberline/Technical/Articles/advancesinalpigtech.pdf.

(Continued)

*Primary Examiner* — Euncha Cherry
(74) *Attorney, Agent, or Firm* — Avery Dennison Corporation (57) ABSTRACT

Methods of making retroreflective articles include mixing a metal pigment with a binder material. The mixture is applied to a surface of a substrate. The surface can be a flat planar surface or be contoured or have arcuate regions. The binder material forms a binder material layer and the metal pigment forms a leafing pigment layer near a top surface of the binder material layer. Transparent microsphere lenses are embedded in the top surface of the binder material layer. The leafing metal pigment layer conforms to a rear embedded surface of the microsphere lenses to thereby form a retroreflective article. Related retroreflective articles are also disclosed.

41 Claims, 3 Drawing Sheets

(56) References Cited

U.S. PATENT DOCUMENTS

| | | | |
|---|---|---|---|
| 2,403,752 | A | 7/1946 | Phillippi |
| 2,948,191 | A | 8/1960 | Wells et al. |
| 3,190,178 | A | 6/1965 | McKenzie |
| 3,758,193 | A | 9/1973 | Tung |
| 3,971,692 | A | 7/1976 | Anderson |
| 4,102,562 | A | 7/1978 | Harper et al. |
| 4,272,564 | A | 6/1981 | Grewe et al. |
| 4,496,618 | A | 1/1985 | Pernicano |
| 4,605,461 | A | 8/1986 | Ogi |
| 4,678,695 | A | 7/1987 | Tung et al. |
| 4,763,985 | A | 8/1988 | Bingham |
| 5,571,362 | A | 11/1996 | Hachey et al. |
| 5,624,731 | A | 4/1997 | Desjardins |
| 5,812,316 | A | 9/1998 | Ochi et al. |
| 5,835,271 | A | 11/1998 | Stump et al. |
| 5,896,227 | A * | 4/1999 | Toriumi ............... B29C 70/74 359/536 |
| 6,531,230 | B1 | 3/2003 | Weber et al. |
| 7,303,292 | B2 | 12/2007 | Yukawa et al. |
| 2007/0195406 | A1 | 8/2007 | Wood |

OTHER PUBLICATIONS

Internationl Preliminary Report on Patentability issued in corresponding International Application No. PCT/US2014/070723 dated Jul. 5, 2016.

Internationl Search Report and Written Opinion issued in corresponding International Application No. PCT/US2014/070723 dated Sep. 28, 2015.

\* cited by examiner

HIGH REFLECTIVITY OPEN BEAD METHOD AND MATERIAL

CROSS-REFERENCE TO RELATED APPLICATION

The present application claims the benefit of U.S. Provisional Application No. 61/921,617 filed Dec. 30, 2013, which is incorporated herein by reference in its entirety.

FIELD

The present subject matter relates to retroreflective sheets and related methods. In particular, the subject matter relates to methods of making retroreflective sheeting with transparent microsphere lenses embedded in a binder material containing metal pigment arranged in a leafing manner, and related articles.

BACKGROUND

Retroreflective articles are employed for various safety and decorative purposes. One type of retroreflective article includes small beads or spheres, typically made of transparent to semi-transparent glass. The beads have a reflective material positioned at a rear surface. Incoming light enters the front surface of the beads, refracts at the front surface, reflects off the reflective material at the rear surface and back toward the front surface, and refracts out of the front surface back toward the light source.

Reflective materials are conventionally deposited at the rear surface of the beads in one of two manners; either as a continuous layer that is separate and apart from the beads, or as a coating on the rear outer surface of the beads.

Various problems are associated with these conventional methods. Specifically, when a reflective layer is formed separate and apart from the beads, the separate layer is not conformed to the curved rear surface of the beads, but remains as a flat reflective surface. Such flat reflective surfaces fail to provide the desired retroreflective fill factors necessary for certain applications.

Further, coating a reflective layer directly on the rear surface of the beads introduces orientation problems when applying the beads to a substrate. In particular, the beads have to be positioned on a substrate in a manner so that the front surface of the beads which is free of coating, is directed away from the substrate and toward the light source. Often intricate processing steps and specialized equipment are required to provide such proper orientation of the spheres on the substrate. Additionally, such coating processes often involve vapor deposition of a metal onto the rear surface of the spheres, which further increase the cost and time associated with forming retroreflective articles. More complex orientation problems arise when trying to attach the coated beads to a surface that is not flat and planar. Often, retroreflective films are used for this purpose. In such methods, when attempting to apply a flat film containing a layer of the coated spheres onto a contoured surface, the film does not lay smoothly on the object, and tends to fold and crease, thus resulting in decreased retroreflective efficiency for the films.

SUMMARY

The difficulties and drawbacks associated with previously known retroreflective articles employing small beads are overcome in the present retroreflective articles and related methods. Methods of the present subject matter involve mixing a binder material with a reflective pigment to create a composite material. The composite material is deposited directly to a surface of a substrate and is developed to form a binder material and a reflective pigment layer that arranges in a leafing manner. The surface of the substrate can be flat and planar or can have contours or arcuate regions. When the composite material is developed, the pigment forms as a reflective pigment layer, wherein the pigment particles arrange in a leafing manner near a top surface of the binder material layer. Thereafter, beads are embedded in the binder material layer. The pigment layer conforms in a cup-like fashion to an embedded curved surface of the beads and is in close proximity thereto. By these methods, the reflective pigment layer is not entirely flat and planar, but at areas adjacent to the beads, the reflective pigment layer closely associates with the curved rear surface of the beads; much like vapor deposited reflective coatings, but without orientation problems that arise therefrom.

In one embodiment, the present subject matter provides an article defining an outer face and comprising a binder material. The article includes metal pigment in the binder material, the metal pigment being disposed in the binder material to form a pigment layer in the binder material. The article includes transparent microspheres at least partially embedded within the binder material and exposed along the outer face of the article. The transparent microspheres are generally disposed between the pigment layer and the outer face of the article.

In another embodiment, the present subject matter provides a method of making an article comprising a pigment layer and transparent microsphere lenses. The method comprises forming the pigment layer. The pigment layer includes metal pigment particles. The method also comprises bonding the transparent microsphere lenses to the pigment layer using a binder material, thereby making the article.

In another embodiment, the present subject matter provides a retroreflective article comprising transparent microsphere lenses and metal pigment. The metal pigment comprises metal pigment particles that are at least partially contained in a thermoplastic polymer layer. The metal pigment particles are oriented in a leafing arrangement near a top surface of the thermoplastic polymer layer. The transparent microsphere lenses are exposed along the top surface of the thermoplastic polymer layer and are embedded into the thermoplastic polymer layer to a depth from about 20 to about 70 percent of an average diameter of the microsphere lenses. The metal pigment particles define a flake face and are oriented within the pigment layer such that the flake face conforms to and extends along a portion of adjacent microsphere lenses.

In another embodiment, the present subject matter provides a method of making a retroreflective article. The method comprises developing a composition comprising pigment and a binder material. Developing the composition thereby forms a pigment layer comprising the pigment, and a binder material layer comprising the binder material. The pigment layer is contained in the binder material layer near a top surface of the binder material layer. The method also comprises embedding microsphere lenses in the binder material layer to thereby make the retroreflective article.

In another embodiment, the present subject matter provides a method of making an article comprising a substrate, a pigment layer, a binder material, and transparent microsphere lenses. The method comprises forming the pigment layer by physical vapor deposition of a metal onto a surface of the substrate. The method also includes applying the binder material on the pigment layer. The method further comprises embedding the transparent microsphere lenses in the binder material.

Methods of the present subject matter thus alleviate orientation problems when applying the beads to a surface because the methods do not involve depositing a reflective layer directly on a rear surface of microspheres. In this way, the beads are merely embedded in the thermoplastic layer, and can be positioned on a substrate in any convenient manner. Simple processing steps can be used and no specialized equipment is required to embed the beads. Avoiding vapor deposition of a metal onto the rear surface of the spheres decreases the cost and time associated with forming retroreflective articles.

Further, instead of conforming flat films, containing a layer of spheres, to a surface having contours or arcuate regions; the present subject matter provides methods of directly coating the composite material to the contours or arcuate regions, and embedding the beads in the composite material. Such methods allow for retroreflective surfaces to be formed on substrates having complex curves. The present subject matter produces a reflective layer that conforms to the curved rear surface of the embedded microspheres, thereby increasing retroreflective efficiency.

As will be realized, the subject matter described herein is capable of other and different embodiments and its several details are capable of modifications in various respects, all without departing from the claimed subject matter. Accordingly, the drawings and description are to be regarded as illustrative and not restrictive.

BRIEF DESCRIPTION OF THE DRAWINGS

These, as well as other features, aspects, and advantages of the present subject matter, will be more completely understood and appreciated by referring to the following more detailed description of the exemplary embodiments of the present subject matter in conjunction with the accompanying drawings.

DETAILED DESCRIPTION OF THE EMBODIMENTS

The subject matter described herein provides retroreflective articles and related methods for producing the articles. Articles made by the present methods include pigment, binder material, and transparent microsphere lenses (also referred to herein as "beads", "spheres", or "lenses").

Figure 1:
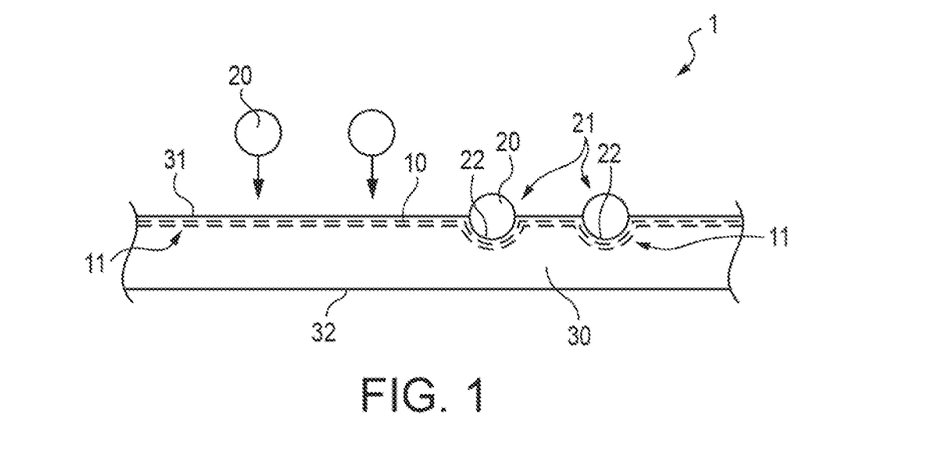
FIG. 1 is a schematic, cross sectional view of an article in accordance with the present subject matter.
Figure 2:
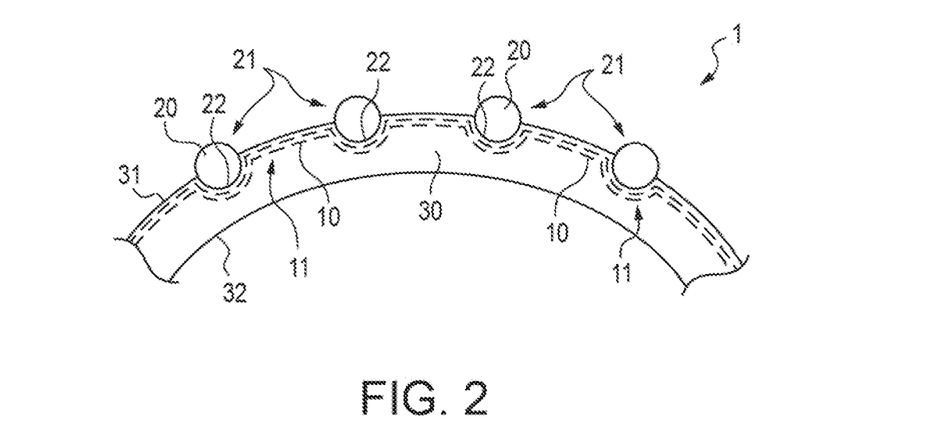
FIG. 2 is a schematic, cross sectional view of the article of FIG. 1, having a contoured surface.

In reference to the right side of FIG. 1 and to the entirety of FIG. 2, in one embodiment, a retroreflective article 1 of the present subject matter includes binder material, microspheres 20, and reflective pigment particles 10. In one embodiment as depicted in the figures, the binder material is formed into a binder material layer 30 which comprises a substantially two-dimensional layer, including a bottom surface 32 and a top surface 31. By "two-dimensional," it is meant a layer, wherein a thickness of the layer is significantly smaller than all other dimensions of the layer, for example, a thin coating or film layer. In reference to FIGS. 1-6, the binder material layer 30 is depicted as a two-dimensional layer, wherein a thickness, as measured from the top surface 31 to the bottom surface 32, is significantly less than any other dimension of the binder material layer 30. As explained in greater detail herein, two-dimensional shapes are generally layer-like, and include relatively flat and planar-like, and contoured configurations that include one or more arcuate or non-flat regions.

However, it will be understood that in other embodiments, the binder material can have any form or shape, including being a three-dimensional shape. By "three-dimensional" it is meant a form or shape having a thickness that is not significantly smaller than all the other dimensions of the form or shape—such as, for example, a cuboid or sphere shape.

In reference to FIGS. 1-6, the top surface 31 of the binder material 30 has microspheres 20 embedded therein to a depth of approximately 50% of a diameter of the spheres, thereby forming a microsphere layer 21 on the top surface 31 of the binder material layer 30.

In one embodiment as shown in FIGS. 1-5, the binder material 30 also includes therein, a reflective leafing pigment layer 11 comprising reflective pigment particles 10 arranged in a leafing manner. The reflective pigment layer 11 is located near the top surface 31 of the binder material 30, and the reflective pigment layer 11 conforms to a rear surface 22 of the embedded microspheres 20 as shown. The pigment layer 11 acts as a light reflecting layer on the retroreflective article 1.

Figure 3:
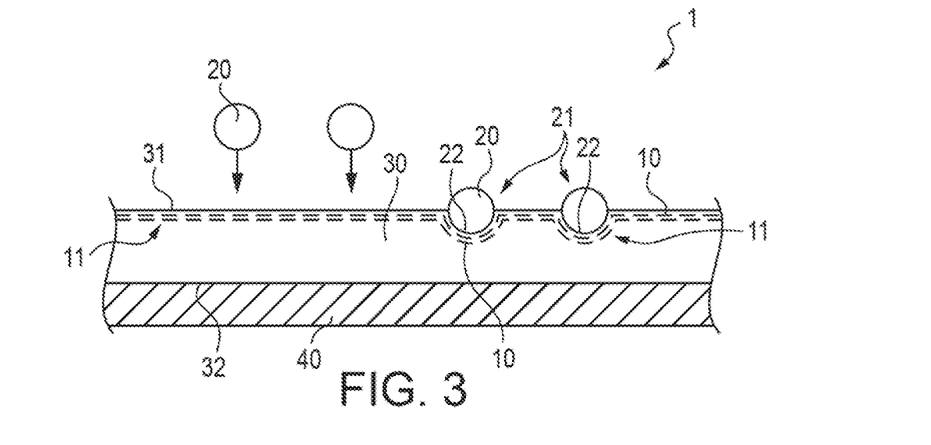
FIG. 3 is a schematic, cross sectional view of an article, including a substrate, in accordance with the present subject matter.
Figure 4:
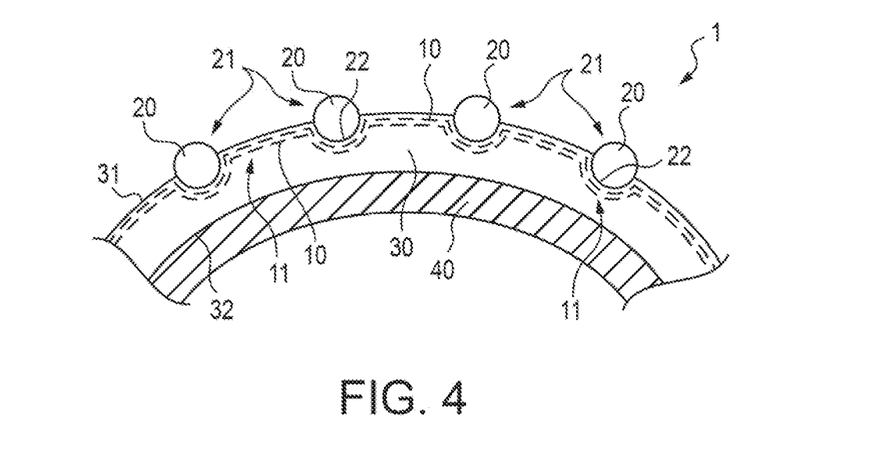
FIG. 4 is a schematic, cross sectional view of the article of FIG. 3, having a contoured surface.
Figure 5:
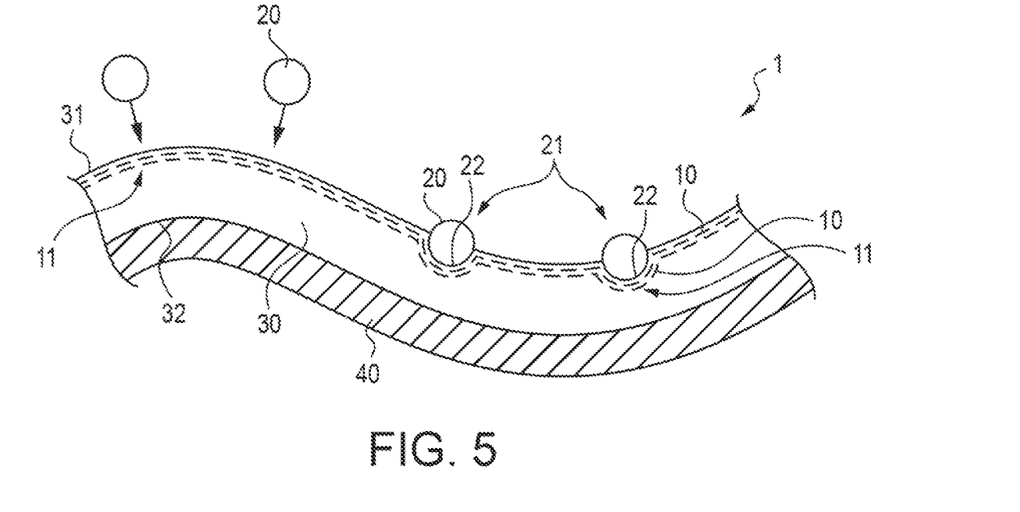
FIG. 5 is a schematic, cross sectional view of an article in accordance with the present subject matter.

In one embodiment, as shown in FIGS. 3-5, the retroreflective article 1 further includes a substrate 40 that is at least partially covered by the binder material 30. The substrate 40 can be flat planar as shown in FIG. 3, can have a surface with contours or arcuate regions as shown in FIG. 5, or can be shaped to have a contoured surface as shown in FIG. 4. By "contours", "contoured", or "arcuate regions" it is meant a surface that is not flat and planar, but that is curved or undulating.

Although the substrate is depicted in the figures as being two dimensional (FIGS. 3-6) and generally being in the form of a layer, it will nevertheless be understood that the substrate can be three dimensional (such as, for example, a cuboid or sphere shape) and/or have a surface with contours or arcuate regions.

The following is a more detailed description of the various components included in the retro reflective articles of the present subject matter.

Pigment and Pigment Layer

In one embodiment in accordance with the present subject matter, specific reflective pigments are used. Suitable reflective pigment comprises particles with a high surface tension, which are not wetted or substantially wetted by the binder material when mixed therein. The pigment particles have a major dimension that is significantly larger than a thickness thereof.

In one embodiment, the pigment particles are mixed with the binder, and when the viscosity of the binder material is appropriate, the pigment particles 10 are able to form as a pigment layer 11 near, but not over, the top surface 31 of the binder material. That is, the pigment particles 10 are disposed under the top surface 31 of the binder material layer 30. Further, because the pigment particles have a high aspect ratio, in certain embodiments the particles partially overlap and arrange in a flat orientation and closely to one another. Further, in areas between embedded microspheres 20, a major surface of the pigment particles 10 align substantially parallel to the top surface 31 of the binder material 30 as shown in FIGS. 1-5. This arrangement is known as "leafing."

When a leafing pigment layer is formed, the pigment particles arrange themselves so that a large flat surface (i.e. a major surface or a flake face) of each particle is parallel, or substantially parallel, with a large flat surface of adjacent pigment particles. This can be visualized for example, when leaves from a tree spread across a lawn and substantially cover the grass from view. The leaves lie in a substantially flat manner on the lawn and overlap adjacent leaves to thereby cover the grass. In a similar way, reflective pigments in accordance with the present subject manner can be used to provide a substantially continuous pigment layer and provide good hiding power relative to the weight percent ("wt %") of pigment used as compared to conventional reflective pigment particles, which do not leaf and require more pigment to effectively provide adequate reflectivity. In leafing, the overlapping deposit of several pigment flakes upon each other, in a multiplicity of layers, provides an effective reflective layer. When microspheres 20 are subsequently embedded in the binder material layer, the pigment particles adjacent to the microspheres, conform to the microspheres, orienting about the curved rear surface 22 of the microspheres 20 in a cup-like fashion. In FIGS. 1-5, the pigment particles 10 (shown in cross section as lines) not adjacent to the microspheres arrange parallel with the top surface 31 of the binder material 30.

In accordance with the present subject matter, the reflective pigment particles have certain size characteristics. These size characteristics contribute to proper leafing of the pigment particles when formed into a reflective leafing pigment layer 11. In one embodiment in accordance with the present subject matter, the pigment particles are substantially flat reflective, flake shaped particles having a measurement in a major dimension of from approximately 10 microns to approximately 25 microns. Further, the particles have a thickness of from approximately 10 nanometers to approximately 50 nanometers. The pigment particles are further defined as having a surface roughness, which is a variation between low and high points on the pigment particles' major surfaces, i.e. flake faces. In one embodiment, the surface roughness of the pigment particles ranges from approximately 1 nanometer to approximately 6 nanometers. This minimal surface roughness also contributes to good reflectivity and to good leafing properties of the pigments, allowing the major surfaces of the pigment particles to arrange closely together. If the surface roughness of the particles were greater, typically the major surfaces of the particles would be spaced more apart, wherein the rough surfaces would increase the separation between the particles and reflectivity would decrease. It will be understood that when reciting a measurement value for a particular sample having a size distribution, (e.g., the pigment particles, or the microspheres) all recited values are considered to be the "median size D50" of the sample; wherein the D50 value is a measurement value that splits the distribution of the sample, by weight, with half the weight of the sample above and half the weight of the sample below the recited measurement value.

In one aspect in accordance with the present subject matter, the reflective pigment comprises particles having a particle size of about 10 microns to about 25 microns in a major dimension, a thickness of about 10 nanometers to about 50 nanometers, and a surface roughness of about 2.5 nanometers to about 4.7 nanometers. The pigment particles may have an average aspect ratio—calculated by dividing the average of the particles' largest dimension by the average of the particles' thickness—that ranges from about 2,000 to about 25,000. In this aspect, the pigment particles are in the form of flakes.

When properly formed into a reflective layer 11 in accordance with the present subject matter, the reflective pigment particles 10 will arrange themselves in a leafing pattern near the top surface 31 of the binder material layer 30. While not being bound to any particular theory, it is believed that because of their particular shape and size, particles in accordance with the present subject matter have high interfacial tension and are thus not completely wetted by the binder material. When any solvent in the binder material is evaporated, the evaporation process causes convection currents within the binder material to push or otherwise assist the particles to form in a leafing arrangement near the top of the binder material layer. In contrast, conventional pigment particles do not have the noted size characteristics and tend to be substantially wetted by the binder material. Accordingly, conventional pigment particles are unaffected by convection currents and spread throughout the binder material layer rather than near the surface. The leafing pigments layer 11 formed in accordance with the present subject matter, thus creates a smooth reflective surface that is orders of magnitude thinner, and has greater reflectivity, than layers formed with conventional ball milled reflective pigment flakes, owing to the minimal aspect ratio, minimal thickness, and minimal surface roughness of the particles. The resulting increase in reflection as compared to conventional reflective pigment particles is due at least in part, to the reflective pigment particles arranging in a leafing manner near the surface of the binder material layer 30. In contrast, conventional ball milled pigment particles have larger particle thickness and greater surface roughness, and thus do not arrange in such a closely packed leafing manner near the surface of the binder material layer, and do not result in such increased reflection. Accordingly, pigments used in accordance with the present subject manner improve reflecting power over these conventional ball milled pigment particles.

In one embodiment, the pigment particles 10 are at least partially contained in the binder material layer 30. In other words, at least a portion of each of the particles is embedded in the binder material layer. In one aspect of this embodiment, the pigment particles are fully embedded in the binder material layer as shown in FIGS. 1-5.

In one embodiment, the pigment particles 10 themselves and the pigment layer 11, conform to the curved shape of the embedded rear surface 22 of the spheres 20. That is, the pigment particles are oriented with one of their two major surfaces facing the embedded surface 22 of the microspheres 20 and overlap in a leafing manner. Further, the pigment particles 10 bend, flex, or otherwise deform through their largest dimension to conform to the contour of the microspheres 20, thereby providing good retroreflective efficiency. For embodiments in which the pigment particles are in the form of flakes, in particular versions of the present subject matter at least a portion of the flakes are oriented within the pigment layer such that the flake faces conform to, and extend along, a portion of the outer spherical surface of the microspheres disposed adjacent thereto.

Besides particle size, other relevant considerations in making a reflective leafing pigment layer include techniques used to form the leafing pigment layer, formulation of the composite material or other vehicle used for delivering the pigment particles to the surface, and the amount of pigment particles used in the composite material, among others.

In one embodiment in accordance with the present subject matter, the pigments are devoid of intentionally added fatty acid lubricants so that the pigment particles do not substantially float on top of the binder material. If fatty acid lubricants were added to the pigments, the pigment particles would tend to float on top of the binder material in which they were dispersed. In the resulting reflective article formed therefrom, the pigments particles would thus be exposed, wherein they would lie atop the binder material layer, rather than being fully contained therein. This arrangement would decrease durability of the reflective layer 11 in that the pigment particles would be subject to degradation, such as from being exposed to abrasion and other environmental factors that could result in damage to the pigment layer 11 and cause a decrease in reflection for the retroreflective article.

In contrast, the pigments of many embodiments of the present subject matter are devoid of intentionally added fatty acid lubricants, and have certain size characteristics as disclosed herein, which result in the pigment particles being incorporated into the binder material to form a layer near, but not on top of the binder material layer. Accordingly, a thin layer of the binder material lies over the pigment particles as shown in FIGS. 1-5. Durability of the reflective pigment layer 11 is thereby maintained because the binder material, and not the pigment particles 10, is exposed to environmental factors, such as abrasion. The pigment particles form a pigment layer 11 near the top surface 31 that has high specular reflection due to the overlapping leaves/flakes and the durability of the retroreflective article 1 is thereby maintained.

In one embodiment the reflective pigment is included in the composite material in an amount of about 0.1 wt % to about 30 wt % of the composite material. In another embodiment, the pigment is included from about 0.5 wt % to about 10 wt % of the composite material. When the composite material contains less pigment, the pigment layer may not provide the desired reflectivity, whereas incorporating more pigment typically results in only small increases in reflectivity and may begin to interfere with the formation of a strong binder material layer.

Viscosity of the composite material is another relevant consideration in forming the pigment layer 11. If the viscosity is too high, the pigment particles 10 will not align in a leafing pattern. If the viscosity is too low, coating of the composite material on to a substrate will be difficult and may result in a layer of composite material that does not provide adequate reflectivity. Viscosity will be adjusted based on the intended use of the retroreflective article and the method used to apply the composite material to a surface, among other considerations.

A nonlimiting example of one type of pigment that is appropriate for use in the present subject matter is known as vacuum-metallized pigment (VMP). These pigments are formed by vapor deposition of high purity aluminum, or other metal, onto a substrate. Other metals used to form VMPs can include gold, silver, copper, nickel, chromium, tin, or combinations thereof. The vapor deposited metal layer is deposited on the substrate at a thickness ranging from about 10 nm to about 60 nm. The vapor deposited metal layer is removed from the substrate and separated into VMP pigment particles having a desired size distribution. The particles are typically dispersed in a vehicle comprising a solvent and provide good specular reflection. It is contemplated that the pigment particles used in accordance with the present subject matter can be formed by other methods.

Examples of VMP metal pigment appropriate for use in the present subject matter include Metalure A-31010 AE, and Metalure A-31017 AE, both from Eckart; L-12526, and Starbrite 5102 EAC, both from Silberline. It is contemplated that other metal pigment formed by VMP processes, or other methods, can be used in accordance with the present subject matter.

Other types of reflective pigments, such as conventional ball milled prepared reflective pigments can be used in addition to, or exclusive of, using reflective pigments that are capable of arranging in a leafing manner as described herein, as long as the other pigments provide adequate reflectivity, and when used in combination with reflective pigments that are capable of arranging in a leafing manner as described herein, do not detract from the retroreflectivity provided by the reflective pigments that are capable of arranging in a leafing manner as described herein. The various properties of any pigment used, such as reflectivity, brilliance, flop, color intensity, distinction of image, hiding power etc., are influenced by the particle size, particle size distribution, and particle morphology.

The thickness of the reflective leafing pigment layer 11 depends on the particular pigment particles and amount used, and the particular binder material used. The reflective pigment layer 11 can range in thickness from about 10 µm to about 100 µm. However, the present subject matter includes the use of reflective pigment layers having thicknesses outside of this range.

Binder Material and Binder Material Layer

In accordance with the present subject matter, the binder material included in the retroreflective articles is used as a material in which the pigment particles 10 form a reflective pigment layer 11.

In one embodiment, the binder material is also used as a vehicle by which the pigment particles 10 are delivered to a surface of a substrate 40. The binder material, having the pigment particles dispersed therein, is coated or otherwise applied on a substrate. The pigment particles form a reflective pigment layer 11 as described herein, near the top surface 31 of the binder material layer 30, which at least partially covers or is co-extensive with the substrate. Accordingly, the reflective pigment layer also at least partially covers the substrate. Further, it is through the binder layer 30 that the pigment layer 11 is bonded to the substrate 40.

Besides providing a material in which the pigment particles 10 form a reflective pigment layer and/or being used as a vehicle for the pigment particles, the binder material is also used to secure or bond the microspheres to the pigment.

In accordance with the present subject matter, the binder material has good durability, such as resisting abrasion, degradation from UV or other radiation, moisture resistance, etc. The binder material forms a strong bond between the microspheres 20 and the pigment particles 10 so that the microspheres 20 will resist dislodgment from the final product by rubbing or scraping.

In one embodiment, as shown in FIGS. 1-5, wherein the microspheres 20 are embedded in the binder material layer 30, the binder material bonds the microspheres in close proximity with the leafing pigment layer 11. Thereby, the reflective pigment layer 11 is closely situated near the embedded surface 22 of the spheres 20, much like vapor deposited reflective layers on microspheres, and thus produces high retroreflection efficiency without orientation problems. As depicted in FIGS. 1-5, a portion of the pigment layer 11, conforms to the curved shape of the embedded rear surface 22 of the spheres 20. Further, a major surface (i.e., a flake face) of some of the pigment particles 10 aligns substantially parallel to the embedded surface 22 of the spheres 20.

In accordance with the present subject matter, the binder material can be two- or three-dimensional and can have, or can be shaped to have, surfaces that are contoured or arcuate. Shaping of the binder material can take place before and/or after the microsphere layer 21 is formed thereon.

The binder material should be compatible for mixing with the pigment, and be adapted to form a good bond with the substrate and the microspheres. Thereby, the binder material is able to form a strong bond between the pigment particles and either or both of the microspheres and the substrate. In one embodiment, the adhesion between the binder material and the substrate and/or between the binder material and the microspheres is greater than the tensile strength of the binder material.

The composition of the binder material is not particularly limited as long as the binder material can adequately perform these and other functions. In this way, the binder material can comprise polymers, which includes polymers, pre-polymers, copolymers, and hybrid polymers. Further, the binder material can comprise adhesives, metals, glass, ceramics, or combinations thereof. The polymers can include cured or curable polymers. Curable polymers can include radiation curable polymers and polymers that cure by means of a curing catalyst. As used herein, curable or crosslinkable mean that the polymer has functional groups capable of reacting with introduction of a crosslinking agent or catalyst.

Suitable polymers can comprise one or both of thermoplastic and thermoset polymers, such as polyurethane, polyester, polyvinyl acetate, polyvinyl chloride, polyvinyl butyral, acrylic such as polymethylmethacrylate, epoxy resins, or combinations thereof. Copolymers of ethylene and an acrylic acid or methacrylic acid; vinyls, fluoropolymers, polyethylenes, cellulose acetate butyrate, polycarbonates and polyacrylates are other examples of polymers that can be used in the retroreflective articles of the present subject matter.

The binder material can also comprise other components, such as for example, solvents, filler, emulsifiers, coloring agents, water, rheology modifiers, and the like, that are used to adjust the viscosity, dispersability, color, rheology, or other characteristics, of the binder material. Suitable solvents include methyl ethyl ketone ("MEK"), ethyl acetate, cyclohexanone, and aromatic hydrocarbons such as toluene or xylene, methylene chloride, or the like which will dissolve the resin. The binder material/pigment dispersion preferably contains from about 10 to about 20 weight percent solids (e.g. pigment particles plus dry polymer solids before being dissolved), with the remainder being solvent. If dispersions are formed having substantially higher solids content, then the viscosity may increase to a point where the pigment particles 10 may not settle near the top surface 31 of the binder material layer 30 in a leafing manner, but may remain dispersed therein.

In one embodiment, the binder material layer is clear and relatively colorless to achieve maximum reflective efficiency. If desired, however, transparent coloring agents may be incorporated therein to impart a colored appearance, such as red or blue, to the material. Alternatively, an effective amount of $TiO_2$ or other whitening agent may be incorporated therein to give the article a more brilliant white appearance, or if desired, a fluorescent pigment may be incorporated therein.

In one embodiment binder materials having elastomeric properties are used to provide retroreflective articles that can be repeatedly stretched or flexed, and upon release of the stretching or flexing tension, return to substantially their original dimensions without significant loss of retroreflectivity. The binder material may comprise a variety of partially amorphous or semi-crystalline thermoplastic polymers which generally have a soft stage during which the microspheres can be embedded therein. Polyurethanes are available which possess such elastomeric properties and these materials can be used as the binder material. Acrylics, polyvinyl butyrals, aliphatic urethanes and polyesters polymer materials can also be used because of their outdoor durability.

In one embodiment, the binder material comprises a thermoplastic polymer. Thermoplastic polymers are suitable for use in accordance with the present subject matter because they are easily manipulated and molded at temperatures above their glass transition temperatures. Further, the pigments can be easily combined into the thermoplastic polymers with simple mixing techniques. Thermoplastic polymers also offer a convenient means by which transparent microsphere lenses are secured in the retroreflective articles.

In one embodiment the binder material comprises thermoplastic polyurethane. Thermoplastic polyurethanes, which are useful in the film-forming composite material used to prepare the binder material layer 30, can be any of a variety of crosslinkable polyurethanes prepared by combining one or more polyols with one or more organic polyisocyanates. Thermoplastic polyurethane offers hardness, ultimate elongation, tensile strength, elasticity, transparency, heat resistance, green tack, hydrolysis resistance, and resistance to oil, grease, and abrasion resistance at levels suitable for use in the methods of the present subject matter. Suitable polyurethanes include Irostic 9815-03 and Irostic 9827-12, which are thermoplastic polyurethane heat activated adhesive base resins, both from Huntsman International, LLC. Other types of polyurethanes, as well as other types of polymer or non-polymer material can be used.

The binder material can be in a solid form, such as dry pellets, flakes or other forms, or solids in a suspension; the binder material can also be dissolved in an appropriate solvent; or the binder material can be an uncured polymer in solid, liquid, or dissolved form.

Microspheres and Microsphere Layer

Microspheres used in forming the retroreflective articles are generally known in the art. In certain embodiments, the microspheres 20 form a monolayer 21 at least partially covering the binder material layer 30. It will be understood that the microspheres 20 can cover the composite material, which includes covering both the binder material and the pigment particles.

The microspheres used in accordance with the present subject matter are not particularly limited to having a certain material composition, size, shape, or refractive index. Among other characteristics, the refractive index, size, transparency, and shape of the beads all contribute to the overall level of retroreflective efficiency for the retroreflective articles of the present subject matter.

The microsphere lenses of the present subject matter may have any refractive index or average diameter as long as the beads provide adequate refraction for the intended retroreflective application.

Beads suitable for use in retroreflective articles of the present subject matter have a refractive index ranging from about 1.5 to about 2.1. In one embodiment the beads have a refractive index of about 1.92. The index of refraction of the microsphere lenses can also be in the range from about 1.9 to about 2.5, more typically is in the range from about 2.0 to about 2.3, and most often between about 2.10 to about 2.25. In another embodiment in accordance with the present subject matter, the retro reflective microspheres may have a refractive index anywhere from about 1.4 to about 2.7. For instance, if the retroreflective articles are designed for use when wet with water, then microspheres having a refractive index of about 2.5 or greater may provide the most efficient retroreflection. Accordingly, it may be desirable to utilize a mixture of two or more types of beads which are to be applied to articles of apparel such as rainwear. For example, the mixture of beads may include a first type of beads having a refractive index of about 1.9 and a second type having a refractive index of about 2.5 or greater.

The beads do not need to be perfectly spherical but may be slightly oblong or out of round. When the beads are spherical, or substantially so, the size of the beads is the largest diameter. In accordance with the present subject matter, the spheres range in size from about 25 microns to about 250 microns, or can range up to about ⅛ of an inch (3,175 microns) in a major dimension. In certain embodiments, the transparent microsphere lenses utilized in the retroreflective article of the present subject matter may be characterized as having diameters in a range of from about 25 to about 300 microns, particularly 30 to about 120 microns, or more particularly from about 40 to about 80 microns. In one embodiment, the microspheres have substantially uniform diameters, thereby enabling better control of the embedding operations described hereinafter, and resulting in a sheet with substantially uniform brightness and angularity.

The beads can comprise a glass composition, but can also comprise other materials, such as polymers or ceramics having characteristics that provide sufficient retroreflective properties. In one embodiment, the beads are substantially transparent or transparent, but can also have a color. Glass microspheres are typically used although ceramic microspheres such as those made by sol/gel techniques can also be used.

In one embodiment, the spheres 20 are embedded in the binder material layer 30 to a depth from about 20% to about 70% of a diameter of the microspheres. In another embodiment, the spheres 20 are embedded to a depth about 50% of a diameter of the microspheres.

Typically, if the microspheres are embedded to less than 20 percent of their diameter, some of them may be dislodged during subsequent preparation or use of the retroreflective article. If embedded to more than 70 percent of their diameter, the cone angle of the resultant retroreflector may tend to be reduced.

In one embodiment, microspheres 20 form a monolayer 21 of microspheres embedded into the binder material layer 30 as shown in FIGS. 1-6.

The microspheres can be subjected to chemical or physical treatments to improve the bond of the microspheres to the binder layer 30. For example, the microspheres can be treated with a fluorocarbon or an adhesion promoting agent such as an aminosilane to improve the bond, or the binder material layer 30, in which the microspheres have been embedded, can be subjected to a flame treatment or corona discharge to improve the bond between the binder material layer and microspheres, or to the substrate.

Additives

One or more of the pigment, bonding material, and microspheres may also advantageously contain various additives generally known in the art. These includes materials such as inorganic fillers, conductive fillers, pigments, antioxidants, acid scavengers, flame retardants, ultraviolet absorbers, processing aids, extrusion aids, slip additives, anti-static agents, antiblock additives and other thermoplastic polymers. These additives may be added to adjust viscosity, promote mixing, or improve coating, permeability, environmental durability, or to affect other properties of the retroreflective articles.

Methods

Methods of the present subject matter provide articles having suitable retroreflective properties, and provide advantages over conventional techniques. The retroreflective articles of the present subject matter are generally of an open bead design. That is, the microsphere layer 21 is exposed to air rather than being directly abutted to a covering layer that is immediately adjacent to the microsphere layer 21. It will be appreciated however, that such open bead articles can be incorporated with other layers to form open or closed bead retroreflective articles. Additionally, the open bead articles of the present subject matter can be incorporated with other types of retroreflective methods and articles, such as being applied or formed on the faces of cube corner retroreflective sheeting.

In accordance with the present subject matter, methods are provided to form retroreflective articles that include a reflective pigment, microspheres, and a binder material. The pigment, microspheres, and binder material are as previously described, such description being incorporated herein. The present methods are simple and inexpensive, and can be used to efficiently form retroreflective articles having contoured or arcuate surfaces or surfaces that are flat and planar.

The methods of the present subject matter include forming a reflective pigment layer, the pigment layer including a reflective pigment. In one embodiment, formation of the pigment layer includes mixing the pigment with the binder material to form a composite material. In one embodiment, the composite material has a relatively low viscosity, wherein the low viscosity allows the pigment particles to properly align at a location near a top surface of the binder material layer in a leafing manner during formation of the pigment layer.

In one embodiment in accordance with the present subject matter, the composite material includes a suspension of pigment particles in the binder material. Mixing the pigment and the binder material can be accomplished by any conventional means. No specific mixing methods are required, but the methods should sufficiently disperse the pigments in the binder material. In one embodiment, the binder material acts as a vehicle to deliver the pigment particles to the surface of a substrate and allows the pigment particles to form in a leafing pattern.

In one exemplary method, the binder material includes a thermoplastic. In this method, the binder material may comprise a thermoplastic polyurethane polymer or prepolymer. The binder material may further comprise a solvent into which the thermoplastic polyurethane is dissolved or suspended. In one aspect the thermoplastic polyurethane is heat activated. In this embodiment, mixing can be accomplished by first dissolving the thermoplastic in the solvent. In one aspect, the pigment particles and the thermoplastic polyurethane are dispersed together in a solvent. The inclusion of a solvent causes the thermoplastic polyurethane to dissolve and decreases the viscosity of the composite material, thus allowing pigment particles to properly orient themselves in a leafed layer. The pigment, binder material, and solvent are combined and mixed together to create a generally homogenous composite material. The reflective pigment can be introduced directly to the binder material as a dry solid by adding the pigment particles directly to the binder material; or by first suspending the pigment particles themselves in a solvent, such as MEK, and then adding the pigment suspension to the binder material. The resulting composite material is applied to a surface or substrate. The composite material is then dried to drive off the solvent, thereby forming a binder material layer and a reflective pigment layer. The reflective leafing pigment layer forms within the binder material layer and arranges itself near the top surface of the binder material layer.

In another embodiment, the thermoplastic can be heated to a temperature above its glass transition temperature or above its melting temperature. The pigment can be introduced directly to the softened or melted thermoplastic as a dry solid by adding the pigment particles directly to the softened or melted thermoplastic; or by first suspending the pigment particles themselves in a solvent, such as MEK, and then adding the pigment suspension to the softened or melted thermoplastic. Other mixing techniques can be used in accordance with the present subject matter.

Techniques used for mixing are not particularly limited and include combining the pigment particles and the binder material together and stirring, shaking, tumbling, or the like, in order to disperse the pigment particles in the binder material. In accordance with the present subject matter, mixing may further include maintaining shear forces such that the size in a major dimension of the pigment particles is not significantly decreased. Further, additional solvent may be added to the composite material before or after mixing, in order to reduce the viscosity such that the pigment particles are able to properly form a leafing layer.

In another embodiment, the composite material is applied to a substrate 40 in order to form the binder material layer 30 and pigment layer 11 on the substrate. The substrate itself can initially be two-dimensional as shown in FIGS. 3 and 5, and can have a surface that is flat planar as shown in FIG. 3, or have contours or arcuate regions as shown in FIG. 5. Alternatively, the substrate can be three-dimensional (not shown).

The substrate 40 can be used as a carrier or can be used as an integral part of a retroreflective article. The binder material layer 30 containing the pigment layer 11 can be removed from a carrier substrate and used independently from the carrier substrate, such as by applying the binder material layer 30 containing the pigment layer 11 to a different substrate.

The composite material may be applied to a substrate at a wet thickness from about 1 to about 100 mils (about 25 to about 2500 microns), from about 2 to about 15 mils (about 50 to 375 microns), or from about 3 to about 4 mils (about 75 to 100 microns). Thinner coatings may tend to contain too few pigment particles to provide the desired multiplicity of leafed flakes deposited upon each other to provide the desired reflectivity. The pigment particles in thicker coatings may tend to orient themselves in other than a parallel orientation, and therefore may not provide the desired reflectivity.

The composite material may be applied to a substrate by any method including dipping, spraying, knife coating, curtain coating, thermoforming, silk-screening, printing, brushing, bar coating, slot die coating, reverse roll coating, gravure coating, or other known coating or layer forming methods. The uniformity of thickness of a layer of the mixture is not particularly critical, in that the uniformity of thickness does not affect the retroreflective capacity of the present articles because the reflective layer 11 forms near the top surface 31 of the binder material layer 30. In one aspect, the thickness of the binder material can be intentionally varied throughout the layer 30.

In one embodiment, forming the pigment layer further includes development of the composite material. Development may include a mechanism or operation that modifies the composite material so that it has sufficient strength so it can be moved, molded, or otherwise manipulated without migrating, separating, or breaking into more than one portion. In one embodiment, development includes a process, wherein the composite material is dried by heating so that a solvent may be removed from the mixture and the thermoplastic polymer forms a layer or other shape. In another embodiment, development includes curing a thermoplastic polymer or pre-polymers in order to form the binder material layer 30 and pigment layer 11. Curing may include heating, exposure to infrared radiation, or may simply include the passage of time such as when a curing catalyst component has been added to the composite material or binder material, for example.

Development results in the formation of the binder material layer 30 and pigment layer 11, wherein the pigment particles are aligned in a leafing pattern at a surface of the binder material layer as shown in FIG. 1.

In one embodiment, the reflective pigment layer 11 is formed when forming the binder material layer 30. As the binder material layer is developed, the pigment particles form as a reflective leafing layer therein. Methods of forming the binder material layer are not particularly limited and can include applying the binder material (containing the pigment) as a layer on a substrate. Alternatively, forming the binder material layer can include making the binder material layer independent from using a substrate, including extruding or casting the binder material into a shape.

The binder material layer can be formed to be either two-dimensional or three-dimensional (not shown). In one aspect, the binder material containing the pigment is formed into a two-dimensional binder material layer 30, that may be flat and planar as shown in FIGS. 1 and 3, contoured as shown on the right side of FIG. 5, or a combination thereof as shown in the entirety of FIG. 5, wherein the binder material layer 30 on the left side of FIG. 5 is flat and planar. FIG. 4 is an additional example of the planar binder material layer 30 of FIG. 3 provided in a two-dimensional contoured configuration, having been shaped to have a contoured surface, after embedding microspheres therein.

After the binder material layer containing the pigment layer is formed, the binder material layer can be shaped. Shaping the binder material layer can take place before or after the microspheres are embedded therein. Shaping the binder material layer can also include shaping the substrate.

Where the binder material layer 30 is formed without the use of a substrate as shown in FIGS. 1 and 2, or with the use of a substrate as shown in FIGS. 3-6, the binder material layer 30 can thereafter be shaped to have contours, as shown in FIGS. 2 and 4-6. Forming the binder material layer to have contours can be accomplished, for example, by thermoforming, stamping, embossing, bonding with an adhesive, bending, pounding, cutting, extruding, or the like. Forming may include other operations or procedures. In another embodiment, the formed binder material layer 30 is applied to a contoured substrate as a sheet and subsequently heated or otherwise modified, such that the binder material layer conforms to a contoured surface of the substrate. Forming and optionally shaping of the binder material layer can precede embedding the microspheres.

The methods of present subject matter also include bonding microsphere lenses to the reflective leafing pigment layer 11. Techniques used for bonding the microspheres to the leafing pigment layer 11 are not particularly limited. In one embodiment, bonding is accomplished by using the binder material to attach the microspheres 20 to the pigment layer 11. In this method, bonding includes contacting the microspheres to the top surface 31 of the binder material layer 30. The binder material layer contains the leafing pigment layer 11 near the top surface 31. Bonding further includes embedding the transparent microsphere lenses 20 in the binder material layer 30 to a depth from about 20% to about 70% the diameter of the microspheres. In one embodiment, the microspheres are embedded at about 50% the diameter of the microspheres. Bonding further includes securing the embedded microspheres in the binder material.

Techniques used for contacting the microspheres to the leafing pigment layer 11 are not particularly limited. Contacting techniques that can be used for example, include dipping the binder material layer into the beads, spraying or cascading the beads on to the binder material layer, rolling the binder material layer into the beads, or other known methods. Contacting the beads to the top surface 31 is schematically illustrated on the left side of each of FIGS. 1, 3, and 5, and for two beads having arrows in FIG. 6, wherein the beads 20 are shown with arrows indicating that the beads are to be brought into contact with the top surface 31 of the binder material layer 30.

Contacting can include for example, heating the beads so that they initially adhere to a thermoplastic binder material layer 30. Other techniques can be used, such as heating the binder material, in addition to, or in exclusion to heating the beads, in order to initially adhere the beads to the top surface 31 of the thermoplastic binder material layer 30.

Techniques used to embed the microspheres 20 in the binder material layer 30 are not particularly limited. Embedding techniques that can be used, for example, include in one embodiment, the application of heat and/or pressure. In this embodiment, one or both of the binder material and the microspheres are heated. Optionally the microspheres and the binder material layer are pressed together by the application of pressure. By this method, the microspheres 20 are embedded in the binder material layer 30 as shown to the right on each of FIGS. 1, 3, and 5.

In one embodiment, where the binder material is a thermoplastic polymer, such as thermoplastic polyurethane, the microspheres are embedded by heating the binder material layer and/or the microspheres and pressing the microspheres into the binder material layer as shown to the right on FIG. 1. In other aspects, the microspheres can be embedded in the binder material by other methods such as embedding while the binder material is not fully cured. In this aspect the microspheres are applied to a wet binder material layer before curing is done.

After embedding the microspheres in the binder material layer 30, the embedded microspheres 20 are secured in the binder material layer 30. In one embodiment, when a thermoplastic polymer is used as the binder material and the microspheres are embedded using a heating operation, securing includes a cooling, wherein the binder material is brought below its glass transition temperature. In another embodiment, when the binder material is an uncured polymer, securing includes a curing the binder material layer. Other techniques can be used in order to secure the embedded microspheres in the binder material layer.

Coverage of the binder material layer by the microsphere mono-layer 21 can range anywhere up to about 91% coverage, or greater. The upper limit is described as "circle packing". The closer bead coverage is to the limit, the higher the retroreflectivity of the retroreflective articles. Typical coverage amounts can range from approximately 80 to approximately 85%. In one embodiment, the microspheres 20 are packed as closely as possible, ideally in their closest cubic arrangement, to achieve greater brightness and may be so arranged by any convenient process, such as printing, transferring, screening, cascading, coating with a hot can roll, or other methods.

As shown in FIG. 1, microspheres 20 form a layer 21 on the top surface 31 of the binder material layer 30. As shown, the microspheres 20 are bonded, by the binder material, to the leafing metal pigment layer 11. As shown in FIG. 1, as the microspheres 20 are embedded into the surface 31 of the binder material layer 30, whereby the pigment particles 10 align themselves in a parallel orientation to adjacent embedded rear surfaces 22 of the microspheres 20. The pigment particles 10 that are between the microspheres 20, remain in parallel alignment with the top surface 31 of the binder material layer 30.

The article 1 of FIG. 1, having microspheres 20 embedded therein, can be formed or shaped to have contours or arcuate regions in accordance with the present methods. This particular aspect is depicted in FIG. 2, showing the article 1 of FIG. 1, comprising embedded microspheres 20, having been shaped to have contours. This shaping or contouring of the retroreflective article 1 can take place before or after beading operations. This contouring or shaping of the article can be performed by thermoforming stamping, embossing, bonding with an adhesive, bending, pounding, cutting, extruding, or the like, or other shaping techniques in accordance with the present subject matter. In this way, retroreflective articles in the form of sheets or layers, can be shaped by simple methods and procedures. It is also contemplated that non-sheet forms of retroreflective articles could also be shaped as desired using these techniques.

Turning now to FIG. 3, therein is shown the binder material layer 30 containing the pigment particles 10. This binder material layer is formed on a generally flat planar sheet or layer form of a substrate 40 as shown. The binder material bonds the pigment particles 10 to the substrate 40. A bottom surface 32 of the binder material layer 30 contacts, and optionally is used to bond with, the substrate 40. A layer 11 of pigment particles 10 forms near the top surface 31 of the binder material layer 30, as shown. Microspheres 20 are embedded in the binder material layer 30. The layer 11 of pigment particles 10 conforms to adjacent rear surface 22 of the embedded microspheres 20, as shown in FIG. 3. The substrate 40 is not particularly limited and can include a rigid or flexible surface. Thereafter the article can be shaped or formed to have contours as depicted in FIG. 4. This can be accomplished by thermoforming stamping, embossing, bonding with an adhesive, bending, pounding, cutting, extruding, or the like or other known shaping techniques.

In another embodiment and in reference to FIG. 5, therein is shown a sheet or layer form of the substrate 40 that has contours. Formed thereon is a binder material layer 30 containing the leafing pigment layer 11 near a top surface 31 of the binder material layer 30. Microspheres 20 are embedded in the binder material layer 30, thus forming a microsphere layer 21 over the binder material layer 30 and over the pigment layer 11. When the binder material is applied to the substrate, the binder material coats the contours of the substrate. Similarly, the pigment particles also conform to the contours of the substrate and align so that a major surface of the pigment particles will be perpendicular to the contours of the surface of the substrate on which the binder material is applied. When beads are embedded in the binder material layer, the pigment particles conform to adjacent rear surface of the beads, as shown.

In one aspect of the present subject matter, a three-dimensional object or an object having a contoured surface can be coated with a retroreflective layer. The object can be coated, such as by spray coating, with the binder material layer 30. The binder material layer can then be embedded with beads 20, such as by cascading or dipping the coated object into the beads 20. This aspect includes heating at least one of the beads and the coated object, in order to establish an initial tack between the beads 20 and the binder material layer 30. Thereafter the object or beads can be further heated so that the beads 20 sink into, and embed in the binder material layer 30. The pigment layer 11 conforms to the adjacent embedded surfaces 22 of the microsphere lenses 20. In this embodiment, the problems of conventional means for applying a two-dimensional retroreflective film of open bead elements onto a contoured surface are alleviated. The methods herein provide a more uniform and consistent retroreflective layer over substrates having surfaces with contours or arcuate regions. In this way, the present subject matter provides higher retroreflectivity coefficients.

Figure 6:
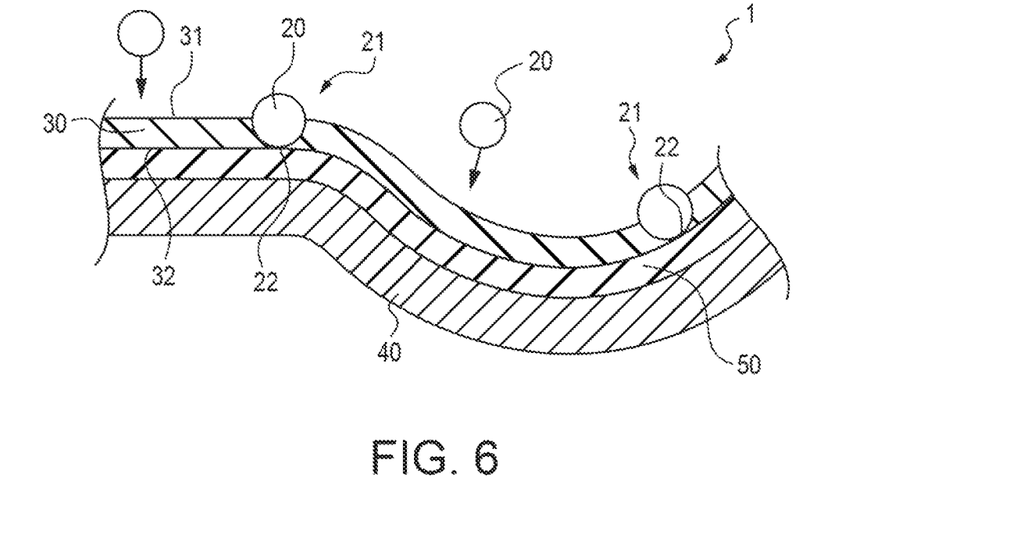
FIG. 6 is a schematic, cross sectional view of an article in accordance with the present subject matter.

In another embodiment in accordance with the present subject matter, and in reference to FIG. 6, therein is shown a two-dimensional substrate 40 having a contoured surface, formed by methods in accordance with the present subject matter. The method includes applying a layer of reflective material 50 to the substrate 40. The layer of reflective material in this embodiment is applied by physical vapor deposition of a metal onto the contoured substrate 40. The metal can be aluminum or other metal as previously disclosed herein. Thereafter, a binder material layer 30 is applied, as previously described herein, over the vapor deposited reflective material layer 50. Microspheres 20 are then embedded in the binder material layer 30 to form a microsphere layer 21 on the top surface 31 of the binder material layer 30. As shown in FIG. 6, a rear embedded surface 22 of the embedded microspheres 20 are shown to directly abut the reflective material layer 50. However, it will be understood that the rear surfaces 22 of the embedded microspheres 20 do not necessarily have to directly abut the reflective material layer 50, but can be spaced therefrom. As with other embodiments in accordance with the present subject matter, the microspheres 20 can be applied by any particular means, including but not limited to, common beading methods such as dipping the contoured substrate 40 in the microspheres 20, or others as disclosed herein. It will be appreciated that in this embodiment, the bonding material layer 30 can additionally include the pigment particles 10 and leafing pigment layer 11 by methods as described herein. In either event, the beading of the contoured substrate can be achieved by simple and inexpensive methods.

Other Layers or Treatments

In one embodiment, the retroreflective articles 1 of the present subject matter may also include a pressure sensitive adhesive and optionally a release liner. An adhesive layer may be applied to the substrate 40 or the binder material layer 30 to serve a functional purpose such as for adhering the article to a surface. Conventional pressure sensitive adhesives such as acrylic-based adhesives or heat- or solvent-activated adhesives are typically used and may be applied by conventional procedures. For example, a preformed layer of adhesive on a carrier web or release liner may be laminated to the substrate 40 or the binder material layer 30. Conventional release liners may be utilized in the formation of the retroreflective article of the present subject matter.

The substrate layer 40 may optionally be an adhesive layer, over which the composite material is applied. Such an adhesive enables the article 1 to be applied to various surfaces, such as fabrics, or provides added adhesion between the binder material layer 30 and the various surfaces. Suitable adhesives include acrylate based compounds and others which will adhere firmly to both the binder material layer 30 and various surfaces. Typically, the adhesive layer will be covered with a protective release liner, usually comprising a polymer film, e.g., polyethylene, which protects the adhesive layer until the release liner is removed and the retroreflective article 1 is applied to a surface.

In one embodiment, one or more protective layers may be applied over the microsphere lenses. The protective layer may be a topcoat and/or a cover sheet. The topcoat and/or cover sheet of the retroreflective sheet overlies and can conform to the microsphere lenses or can be adhered to the article by embossing the cover film to the binder material layer to thereby form a plurality of cells within which microspheres, having an air interface between the microspheres and the cover film.

Examples

The subject matter will now be further illustrate with the following examples, which are intended to be nonlimiting. Various VMP metallized pigments were used for testing and compared to two conventional ball milled pigments. Table 1 indicates the manufacturer, product name, pigment type, and pigment solids loading for the pigments used in the samples listed in Table 2.

TABLE 1

Pigment Composition.
Sample Description Table

| Manufacturer | Product | Manufacturing Type | Solids |
|---|---|---|---|
| Silberline | L-12526 | Metallization Prepared | 10.00% |
| Eckart | Metalure A-31010 AE | Metallization Prepared | 6.00% |
| Silberline | Starbrite 5102 EAC | Metallization Prepared | 10.00% |
| Eckart | Metalure 31017 AE | Metallization Prepared | 6.00% |
| Eckart | Silvershine 51500 | Ball Mill Prepared | 25.50% |
| Eckart | NDF 150 | Ball Mill Prepared | 70.00% |

As shown in Table 1, Silvershine 51500 and NDF 150 are conventional ball milled pigments and are included for comparison.

Table 2 lists the composition percentages for the samples used for testing, including the weight percentage of the pigments from Table 1. Irostic 9815-03 is a thermoplastic polyurethane heat activated adhesive base resin that was dissolved in MEK solvent. The pigments listed in Table 1 were dispersed in the solution to produce samples 1A-6A and 1B-6B. As can be seen, samples 1B-6B contain twice the amount of the respective pigment component as samples of 1A-6A. The samples were applied to a substrate and tested for reflectivity. The results are listed in Tables 3 and 4. For each sample, the reflectivity of the composition was determined by measuring with a photoelectric cell the brightness of reflected light from a known source light beam at an observation angle of −4.00°, 30.00°, and 40.00° for each incidence angle of 0.2°, 0.50°, and 1.00°, according to ASTM E809. All component percentages listed below are by weight

TABLE 2

Sample Composition.

| Sample ID | Irostic 9815-03 | MEK | L-12526 | Metalure A-31010 AE | Starbrite 5102 EAC | Metalure 31017 AE | Silvershine 51500 | NDF 150 | Totals |
|---|---|---|---|---|---|---|---|---|---|
| 1A | 6.25% | 87.75% | 6.00% | | | | | | 100% |
| 2A | 6.25% | 83.75% | | 10.00% | | | | | 100% |
| 3A | 6.25% | 87.75% | | | 6.00% | | | | 100% |
| 4A | 6.25% | 83.75% | | | | 10.00% | | | 100% |
| 5A | 6.25% | 91.40% | | | | | 2.35% | | 100% |
| 6A | 6.25% | 92.89% | | | | | | 0.86% | 100% |
| 1B | 6.25% | 81.75% | 12.00% | | | | | | 100% |
| 2B | 6.25% | 73.75% | | 20.00% | | | | | 100% |
| 3B | 6.25% | 81.75% | | | 12.00% | | | | 100% |
| 4B | 6.25% | 73.75% | | | | 20.00% | | | 100% |
| 5B | 6.25% | 89.04% | | | | | 4.71% | | 100% |
| 6B | 6.25% | 92.03% | | | | | | 1.72% | 100% |

Table 3 provides test results for the samples 1A-6A listed in Table 2. The samples 1A-6A were each coated with a #120 meyer rod (wire diameter=3048 micron) on a substrate and embedded with UB-35M microspheres provided by Union Company of Japan having a size range of about 53 µm to about 75 µm and a refractive index of 1.92. The samples were applied to the substrate in an amount such that after the samples was dried to remove the MEK solvent, the resulting dried coating had a pigment loading of 8.76 wt % and a loading of resin of 91.24 wt %.

TABLE 3

Reflectivity of Samples 1A-6A.
Open Bead Reflectivity @ 8.76 percent loading, # 120

| Transmittance/ Reflectance Angles | 1A L-12526 | 2A Metalure A-31010 AE | 3A Starbrite 5102 EAC | 4A Metalure 31017 AE | 5A Silvershine 51500 | 6A NDF 150 |
|---|---|---|---|---|---|---|
| 0.20°/−4.00° | 415.0 | 387.0 | 391.0 | 425.0 | 262.0 | 73.0 |
| 0.20°/30.00° | 374.0 | 353.0 | 348.0 | 384.0 | 264.0 | 43.0 |
| 0.20°/40.00° | 328.0 | 323.0 | 245.0 | 330.0 | 233.0 | 38.0 |
| 0.50°/−4.00° | 172.0 | 155.0 | 153.0 | 164.0 | 120.0 | 28.0 |
| 0.50°/30.00° | 160.0 | 147.0 | 138.0 | 153.0 | 119.0 | 23.0 |
| 0.50°/40.00° | 145.0 | 139.0 | 108.0 | 140.0 | 110.0 | 21.0 |
| 1.00°/−4.00° | 19.0 | 19.0 | 17.0 | 20.0 | 18.0 | 4.0 |
| 1.00°/30.00° | 18.0 | 17.0 | 16.0 | 19.0 | 19.0 | 6.0 |
| 1.00°/40.00° | 18.0 | 18.0 | 15.0 | 19.0 | 18.0 | 6.0 |

Table 4 provides test results for the samples 1B-6B listed in Table 2. The samples 1B-6B were each coated with a #80 meyer rod (wire diameter=2032 micron) on a substrate and embedded with UB-35M microspheres provided by Union Company of Japan having a size range of about 53 µm to about 75 µm and a refractive index of 1.92. The samples were applied to the substrate in an amount such that after the samples was dried to remove the MEK solvent, the resulting dried coating had a pigment loading of 16.10 wt % and a loading of resin of 83.89 wt %.

TABLE 4

Reflectivity of Samples 1B-6B.
Open Bead Reflectivity @ 16.01 percent loading, # 80

| Transmittance/ Reflectance Angles | 1B L-12526 | 2B Metalure A-31010 AE | 3B Starbrite 5102 EAC | 4B Metalure 31017 AE | 5B Silvershine 51500 | 6B NDF 150 |
|---|---|---|---|---|---|---|
| 0.20°/−4.00° | 433.0 | 389.0 | 422.0 | 444.0 | 316.0 | 119.0 |
| 0.20°/30.00° | 326.0 | 307.0 | 233.0 | 392.0 | 318.0 | 142.0 |
| 0.20°/40.00° | 137.0 | 79.0 | 55.0 | 140.0 | 171.0 | 96.0 |
| 0.50°/−4.00° | 166.0 | 151.0 | 155.0 | 165.0 | 142.0 | 61.0 |
| 0.50°/30.00° | 128.0 | 121.0 | 93.0 | 152.0 | 142.0 | 70.0 |
| 0.50°/40.00° | 61.0 | 40.0 | 24.0 | 68.0 | 86.0 | 51.0 |
| 1.00°/−4.00° | 20.0 | 18.0 | 19.0 | 21.0 | 19.0 | 12.0 |

TABLE 4-continued

Reflectivity of Samples 1B-6B.
Open Bead Reflectivity @ 16.01 percent loading, # 80

| Transmittance/<br>Reflectance Angles | 1B<br>L-<br>12526 | 2B<br>Metalure<br>A-31010 AE | 3B<br>Starbrite<br>5102 EAC | 4B<br>Metalure<br>31017 AE | 5B<br>Silvershine<br>51500 | 6B<br>NDF<br>150 |
|---|---|---|---|---|---|---|
| 1.00°/30.00° | 17.0 | 17.0 | 15.0 | 20.0 | 19.0 | 13.0 |
| 1.00°/40.00° | 11.0 | 9.0 | 7.0 | 14.0 | 17.0 | 11.0 |

As can be seen from the data in Tables 3 and 4, at various pigment wt %, at various coating thicknesses, and at various transmittance and reflectance angles, retroreflective articles containing pigment particles having a particular size and shape characteristics in accordance with the present subject matter, provide improved reflectivity compared to conventional ball milled pigment particles.

Many other benefits will no doubt become apparent from future application and development of this technology.

As described hereinabove, the present subject matter solves many problems associated with previous strategies, systems and/or devices. However, it will be appreciated that various changes in the details, materials and arrangements of components, which have been herein described and illustrated in order to explain the nature of the present subject matter, may be made by those skilled in the art without departing from the principle and scopes of the claimed subject matter, as expressed in the appended claims.

What is claimed is:

1. An article defining an outer face and comprising:
a binder material;
metal pigment in the binder material, the metal pigment disposed in the binder material to form a pigment layer in the binder material;
transparent microspheres at least partially embedded within the binder material and exposed along the outer face of the article;
wherein the transparent microspheres are generally disposed between the pigment layer and the outer face of the article.

2. The article of claim 1 wherein the metal pigment includes pigment particles having an average aspect ratio from 2,000 to 25,000.

3. The article of claim 2 wherein the metal pigment in the pigment layer is disposed in a leafing arrangement.

4. The article according to claim 1 wherein the metal pigment comprises particles having a particle size of about 10 μm to about 25 μm in a major dimension, a thickness of about 10 nm to about 50 nm, and a surface roughness of about 1 nm to about 6 nm.

5. The article according to claim 1 wherein the metal pigment comprises vacuum metalized pigment particles.

6. The article according to claim 1 wherein at least a portion of the transparent microspheres extend into the pigment layer.

7. The article according to claim 2 wherein at least a portion of the metal pigment particles define a flake face and are oriented within the pigment layer such that the flake face conforms to and extends along a portion of adjacent transparent microspheres.

8. The article according to claim 1 wherein the binder material comprises a thermoplastic polymer.

9. The article according to claim 8 wherein the thermoplastic polymer comprises thermoplastic polyurethane.

10. The article according to claim 1 wherein the microspheres are embedded in the binder material to a depth from about 20 to about 70 percent of an average diameter of the microspheres.

11. The article according to claim 1 further including a substrate, wherein the pigment layer is co-extensive with the substrate.

12. The article according to claim 11 wherein the binder material bonds the pigment layer to the substrate.

13. A method of making an article comprising a pigment layer and transparent microsphere lenses, the method comprising:
forming the pigment layer, the pigment layer including metal pigment particles; and
bonding the transparent microsphere lenses to the pigment layer using a binder material, thereby making the article.

14. The method according to claim 13 wherein:
forming includes combining the metal pigment particles and the binder material to thereby create a composite material, and developing the composite material to thereby form a binder material layer, wherein the pigment particles are arranged to form a leafing pigment layer, the pigment layer is contained in the binder material layer near a top surface of the binder material layer; and
bonding includes embedding the lenses in the binder material layer.

15. The method according to claim 12 wherein the metal pigment particles have a particle size of about 10 μm to about 25 μm in a major dimension, a thickness of about 10 nm to about 50 nm, and a surface roughness of about 1 nm to about 6 nm.

16. The method according to claim 13 wherein the metal pigment particles comprise vacuum metalized pigment particles.

17. The method according to claim 14 wherein at least a portion of the metal pigment particles define a flake face and are oriented within the pigment layer such that the flake face conforms to and extends along a portion of adjacent microsphere lenses.

18. The method according to claim 13 wherein the binder material comprises a thermoplastic.

19. The method according to claim 18 wherein the thermoplastic comprises thermoplastic polyurethane.

20. The method according to claim 13 wherein bonding includes heating at least one of i) the binder material, and ii) the microsphere lenses.

21. The method according to claim 13 wherein the microsphere lenses are embedded to a depth from about 20 to about 70 percent of an average diameter of the microsphere lenses.

22. The method according to claim 13 wherein the article further comprises a substrate and the pigment layer is co-extensive with the substrate.

23. A retroreflective article comprising transparent microsphere lenses and metal pigment, wherein:
the metal pigment comprises metal pigment particles that are at least partially contained in a thermoplastic polymer layer, the metal pigment particles being oriented in a leafing arrangement near a top surface of the thermoplastic polymer layer;
the transparent microsphere lenses are exposed along the top surface of the thermoplastic polymer layer and are embedded into the thermoplastic polymer layer to a depth from about 20 to about 70 percent of an average diameter of the microsphere lenses; and
the metal pigment particles define a flake face and are oriented within the pigment layer such that the flake face conforms to and extends along a portion of adjacent microsphere lenses.

24. The retroreflective article according to claim 23 wherein the metal pigment comprises a vacuum metalized pigment.

25. The retroreflective article according to claim 23 wherein the metal pigment particles have a particle size of about 10 μm to about 25 μm in a major dimension, a thickness of about 10 nm to about 50 nm, and a surface roughness of about 1 nm to about 6 nm.

26. The retroreflective article according to claim 23 wherein the thermoplastic polymer layer comprises thermoplastic polyurethane.

27. The retroreflective article according to claim 23 wherein the article further includes a substrate and the thermoplastic polymer layer is co-extensive with the substrate.

28. The retroreflective article according to claim 23 wherein the transparent microsphere lenses are embedded in the thermoplastic polymer layer to a depth of about 50 percent of an average diameter of the lenses.

29. The retroreflective article according to claim 27 wherein the thermoplastic polymer layer bonds the metal pigment particles to the substrate.

30. A method of making a retroreflective article, the method comprising:
developing a composition comprising pigment and a binder material, to thereby form a pigment layer comprising the pigment, and a binder material layer comprising the binder material, wherein the pigment layer is contained in the binder material layer near a top surface of the binder material layer; and
embedding microsphere lenses in the binder material layer to thereby make the retroreflective article.

31. The method according to claim 30 wherein the pigment comprises pigment particles having a particle size of about 10 μm to about 25 μm in a major dimension, a thickness of about 10 nm to about 50 nm, and a surface roughness of about 1 nm to about 6 nm.

32. The method according to claim 30 wherein the pigment layer comprises metal pigment particles.

33. The method according to claim 30 wherein the pigment comprises vacuum metallized pigment particles.

34. The method according to claim 30 wherein:
the binder material is a thermoplastic polymer; and
the composition further comprises a solvent, the thermoplastic polymer being dissolved in the solvent thereby forming a solution, and the pigment being suspended in the solution.

35. The method according to claim 30 the method further comprising shaping the binder material layer.

36. The method according to claim 30 further comprising applying the composition to a substrate.

37. The method according to claim 36 wherein the substrate has a surface with contours.

38. The method according to claim 30 wherein embedding includes heating at least one of i) the composition, and ii) the microsphere lenses.

39. A method of making an article comprising a substrate, a pigment layer, a binder material, and transparent microsphere lenses, the method comprising:
forming the pigment layer by physical vapor deposition of a metal onto a surface of the substrate;
applying the binder material on the pigment layer; and
embedding the transparent microsphere lenses in the binder material.

40. The method according to claim 39 wherein the binder material comprises thermoplastic polyurethane and embedding includes heating at least one of i) the binder material, and ii) the transparent microsphere lenses.

41. The method according to claim 39 wherein the transparent microsphere lenses are embedded in the binder material to a depth from about 20 to about 70 percent of an average diameter of the lenses.

\* \* \* \* \*